UNITED STATES PATENT OFFICE.

HORACE L. DAVIS, OF WORCESTER, MASS., ASSIGNOR TO HIMSELF AND GUSTAVUS W. INGALLS, OF SAME PLACE.

IMPROVEMENT IN ROOFING COMPOSITION.

Specification forming part of Letters Patent No. 105,434, dated July 19, 1870.

*To all whom it may concern:*

Be it known that I, HORACE L. DAVIS, of the city and county of Worcester and State of Massachusetts, have invented a new and useful liquid composition for application to roofs or surfaces liable to atmospheric exposure; and I do hereby declare the same to be described as follows:

In making the said composition I take ten pounds of pulverized slate; one gallon of coal-oil; one gallon of what is termed "dead-oil," and a solution of one pound of sal-soda, and one gallon of water. The whole is to be well stirred or incorporated together, and will then be ready for use. It may be applied to a surface by means of a brush in the way ordinary oil-paint is usually spread, and is an excellent substitute for such.

The dead-oil above mentioned is the refuse of the evaporation of coal-tar oil, and is well known in commerce by the name of dead-oil.

The sal-soda, besides being advantageous in other respects, causes the composition to dry without gloss, and when dry to have the appearance of common slate.

I do not confine my composition to the precise proportions of its ingredients, as hereinbefore explained, as they may be somewhat varied without materially changing the character of the composition.

I am aware that ground slate-rock, coal-tar, and oil-paint have been intermixed in order to form a roofing composition, the same being described in the United States Patent No. 46,495; and therefore I make no claim to the exclusive use of either of such constituents, or any two or all of them, to compose a roofing composition.

Although I use coal-oil and pulverized slate, I do not employ an oil-paint therewith, for I, in connection with the slate and coal-oil, use a quantity of the dead-oil and an alkaline solution, thus introducing into the composition a large amount of water and an alkali to cause it to combine with the mineral oils and to dry without the gloss which it would have were common linseed or paint oil employed.

By avoiding the use of oil-paint and employing in lieu thereof the water and alkali and a quantity of the dead-oil I am enabled to make not only a better, but very much cheaper, composition.

I claim as my invention—

The composition, made in manner and of the materials as hereinbefore first explained.

HORACE L. DAVIS.

Witnesses:
R. H. EDDY,
J. R. SNOW.